June 3, 1958  H. M. GIEPEN  2,836,980
APPARATUS FOR MEASURING WEIGHT AND HEIGHT
Filed July 27, 1953  6 Sheets-Sheet 1
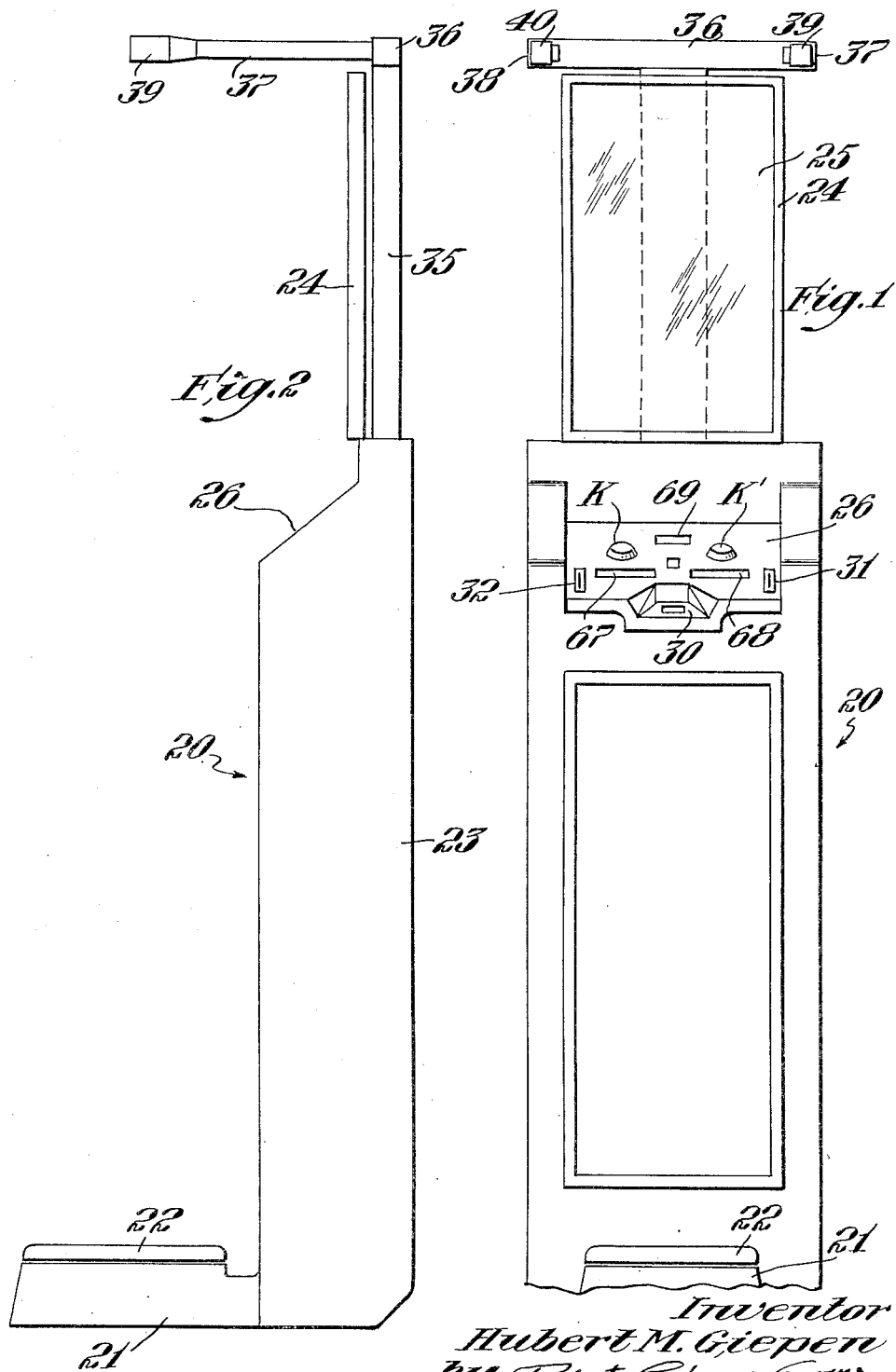

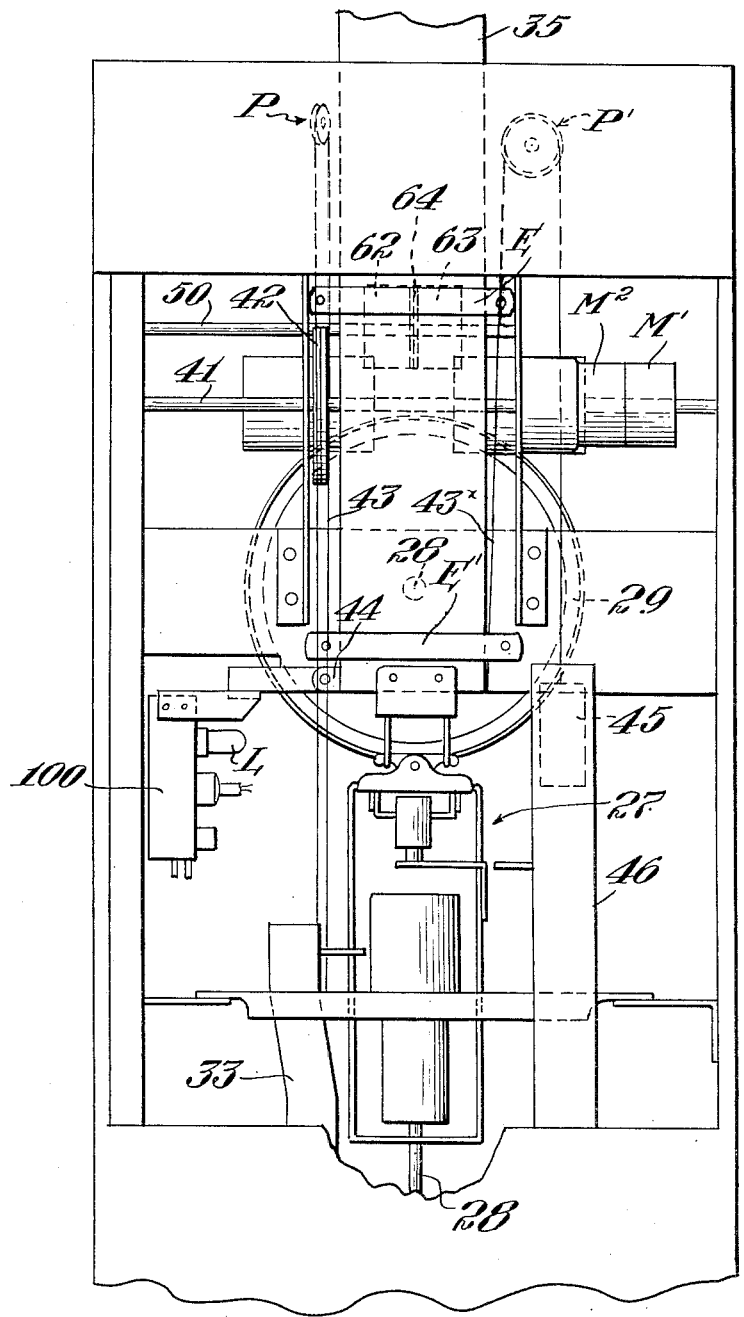

June 3, 1958  H. M. GIEPEN  2,836,980
APPARATUS FOR MEASURING WEIGHT AND HEIGHT
Filed July 27, 1953  6 Sheets-Sheet 3

Inventor
Hubert M. Giepen
by Roberts Cushman & Grover
att'ys.

June 3, 1958
H. M. GIEPEN
2,836,980
APPARATUS FOR MEASURING WEIGHT AND HEIGHT
Filed July 27, 1953
6 Sheets-Sheet 4
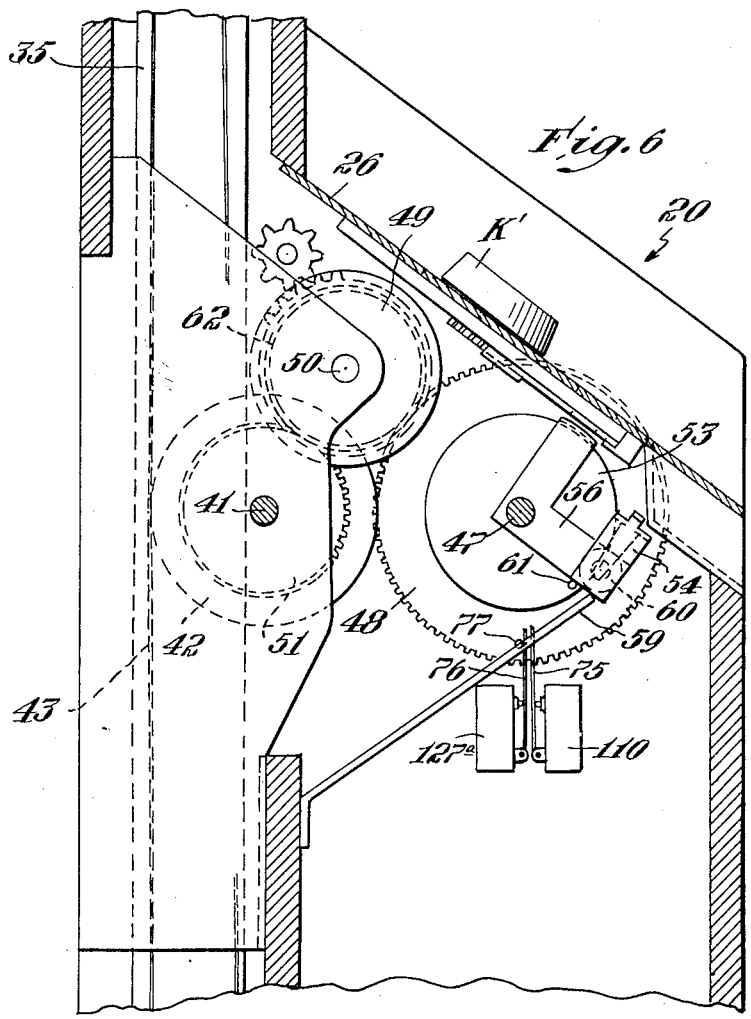
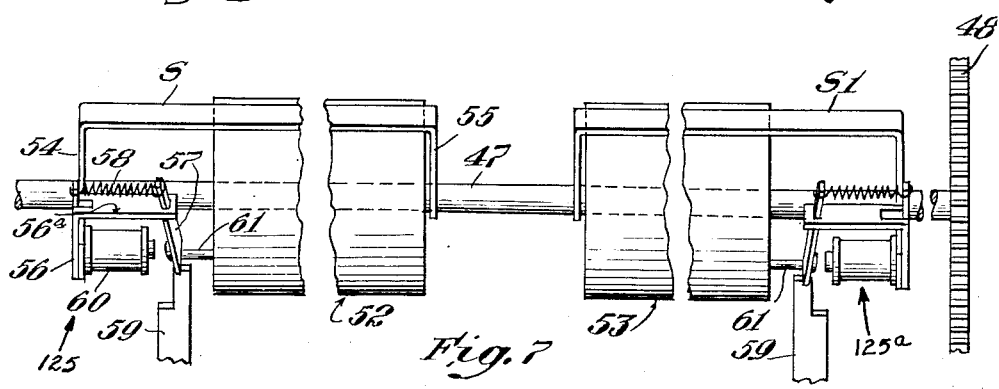
Inventor
Hubert M. Giepen
by Roberts Cushman & Grover
Att'ys.

June 3, 1958  H. M. GIEPEN  2,836,980
APPARATUS FOR MEASURING WEIGHT AND HEIGHT
Filed July 27, 1953  6 Sheets-Sheet 5
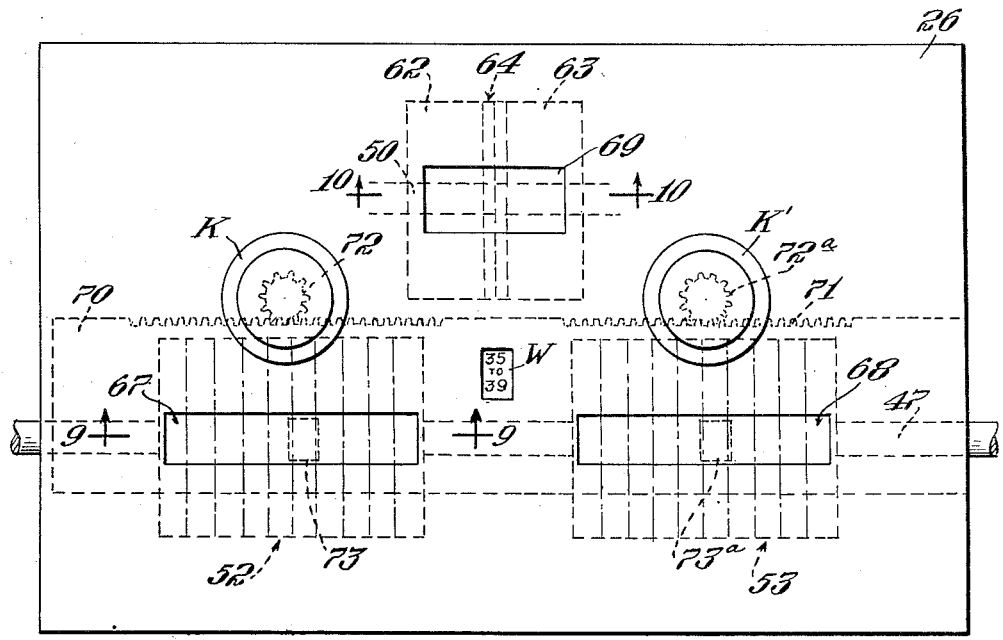
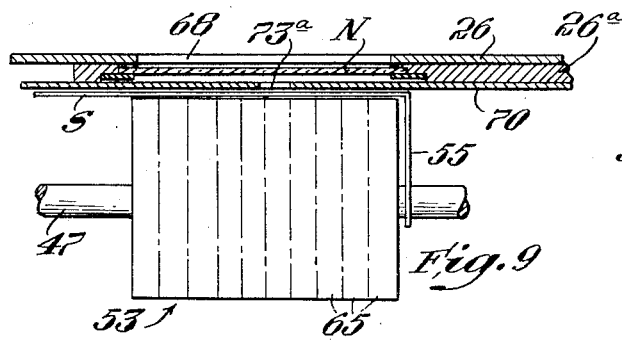
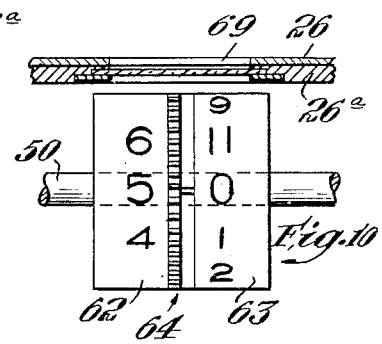
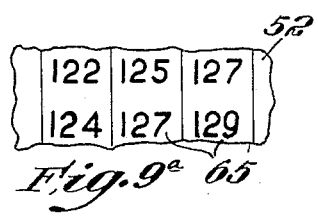
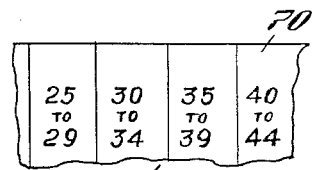
Inventor
Hubert M. Giepen
by Roberts Cushman & Grover
att'ys.

United States Patent Office 2,836,980
Patented June 3, 1958

2,836,980

APPARATUS FOR MEASURING WEIGHT AND HEIGHT

Hubert M. Giepen, Cohasset, Mass., assignor to Red Mill Company, Boston, Mass., a partnership Application July 27, 1953, Serial No. 370,361

25 Claims. (Cl. 73—432)

This invention pertains to measuring apparatus and more especially to coin controlled mechanism operative to indicate a person's weight and height and at the same time to provide information as to whether the weight and height are in the ratio (according to age) which is recognized as proper by medical authorities.

Apparatus of this general type as heretofore devised has customarily required that the user or an attendant actuate the height measuring instrumentality independently of the weight indicating means and then by a process of mental arithmetic or by reference to a printed diagram, or the like, determine whether the indicated weight was in the proper ratio to the height.

Among the objects of the present invention is to provide apparatus such that by merely standing upon a scale platform (and after inserting the proper coin) the actual weight and the height of the user will be automatically indicated and the proper weight, corresponding to said height, will also be shown.

A further object is to provide automatic height measuring means including a part which is moved downwardly from a normal elevated position to a point corresponding to the height of the user, but which is arrested in its downward motion without actual contact of any mechanical part with the user's head.

A further object is to provide height measuring means wherein the interruption of a beam of light by the user's head determines the position of a height measuring element.

A further object is to provide apparatus which indicates the actual weight and height and also the proper weight for the indicated height. A further object is to provide apparatus for automatically indicating the proper weight relatively to the measured height within a given age range and for both sexes respectively.

A further object is to provide height measuring means including a vertically movable arm, normally held in an elevated position and which is held against downward movement until the user steps upon the scale platform.

A further object is to provide novel means for indicating the proper weight according to the measured height.

A further object is to provide apparatus wherein the dropping of a coin automatically starts a motor for actuating the height measuring means.

A further object is to provide apparatus wherein after the height measuring means has completed its measuring operation, it is automatically restored to its normal condition.

A further object is to provide apparatus of the above type which is pleasing in appearance; which is substantially foolproof, and which does not require constant supervision nor frequent repairs.

Other and further objects and advantages of the invention will be pointed out in the following more detailed description and by reference to the accompanying drawings wherein:

Fig. 1 is a front elevation of the apparatus of the present invention illustrating a preferred form of outer casing within which the operative mechanism is enclosed;

Fig. 2 is an elevation of the right-hand side of the device of Fig. 1;

Fig. 3 is a fragmentary rear elevation, to larger scale than Fig. 1, with the rear panel of the casing removed to show the internal mechanism;

Fig. 6 is a fragmentary vertical section, to larger scale than Fig. 1, in substantially the same plane as Fig. 5;

Fig. 7 is a fragmentary front view showing the proper weight indicating cylinders and shaft and cooperating parts removed from the casing;

Fig. 8 is a diagrammatic front elevation of the rearwardly and upwardly sloping top wall of the casing, showing, in dotted lines, the proper weight indicating cylinder;

Fig. 9 is a fragmentary vertical section through the sloping top wall of the casing showing the right hand cylinder in elevation;

Figure 11:
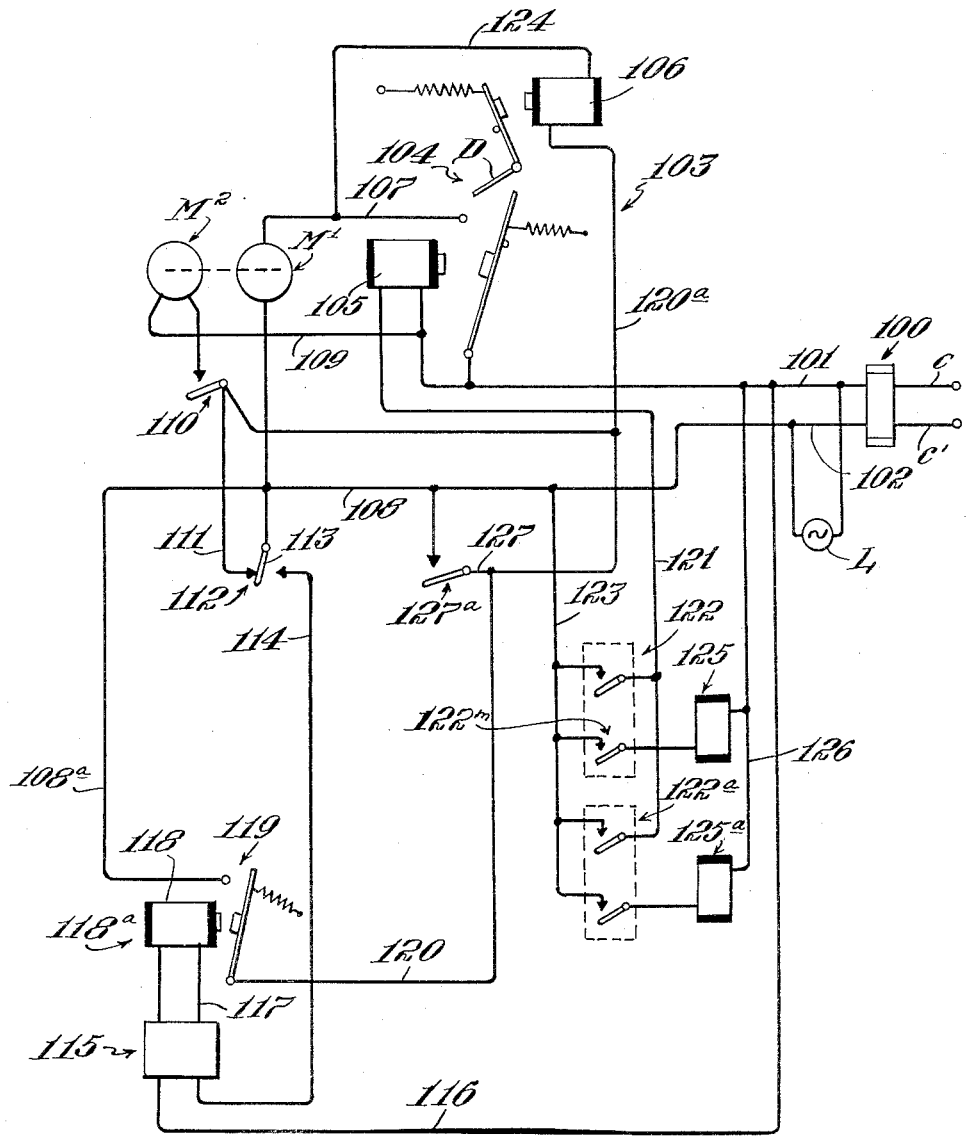

Fig. 9ᵃ is a fragmentary developed view, to larger scale, of the surface of the cylinder of Fig. 9;

Fig. 10 is a view similar to Fig. 9, but showing the height indicating drums;

Fig. 10ᵃ is a fragmentary plan view (to larger scale than Fig. 8) of a part carrying an age indicating scale, and Fig. 11 is a wiring diagram.

Referring to the drawings the numeral 20 designates the apparatus as a whole, the apparatus comprising a base 21, designed to rest upon the floor and carrying a vertically movable scale platform 22. From the rear part of the base a hollow casing 23 rises, this casing comprising front, rear and side walls, the front and rear walls preferably having removable panels to provide access to the mechanism within the casing. Preferably a mirror frame 24 (Figs. 1 and 2) is mounted on the upper part of the casing, this frame holding the mirror 25 which is at a convenient height such that a person, standing on the platform and facing the casing, may see himself. While this mirror is desirable and adds to the attractive appearance of the apparatus it is not necessary to the functioning of the apparatus.

As here illustrated, the upper part of the casing is provided with an upwardly and rearwardly sloping top wall 26 (Figs. 1, 2, 5 and 6) which forms a convenient support for certain of the manually operable elements of the device hereinafter more fully described.

Figure 4:
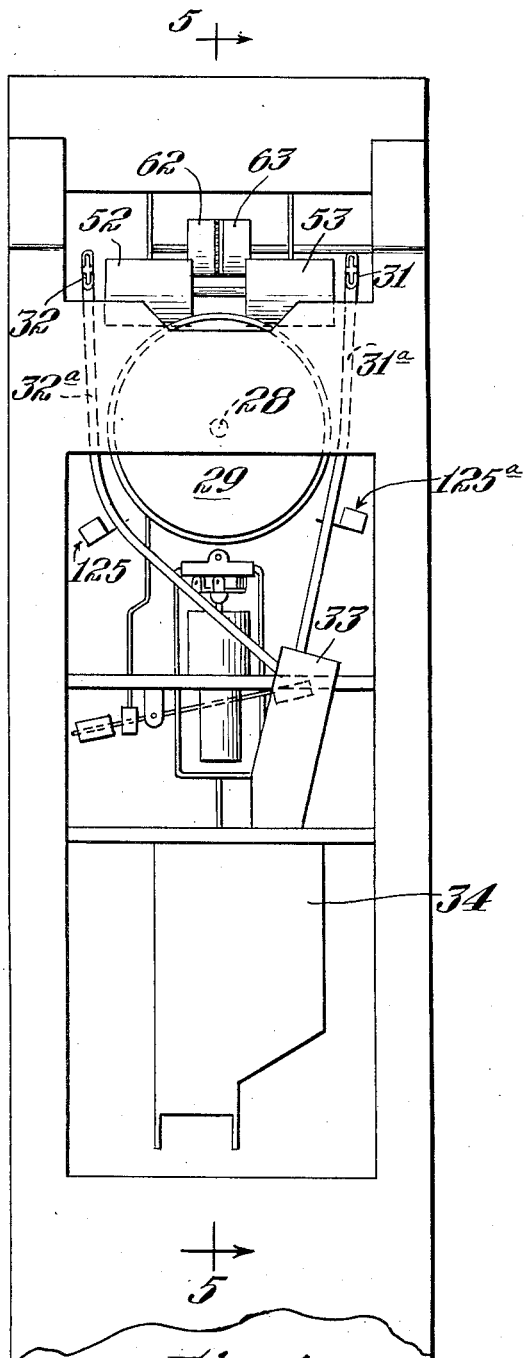
Fig. 4 is a fragmentary front elevation with the front panel of the casing removed.
Figure 5:
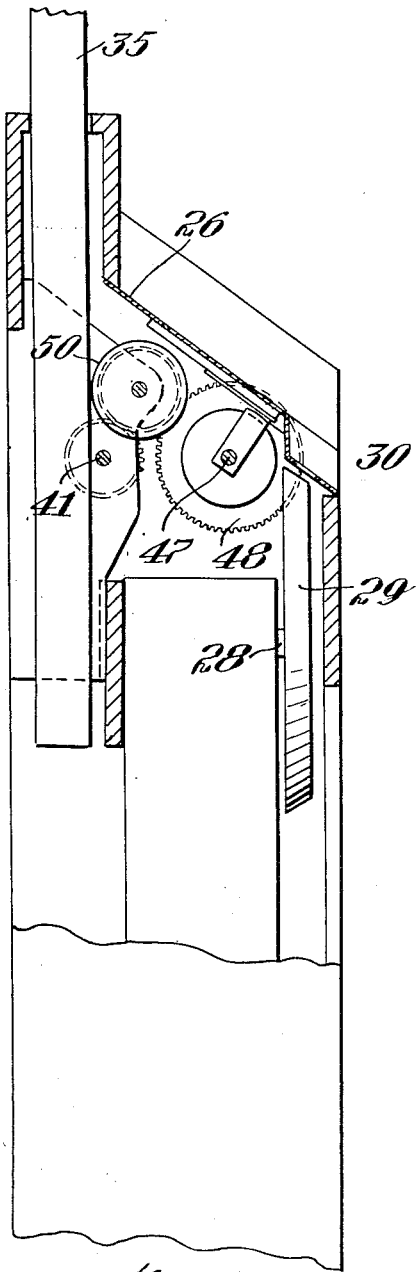
Fig. 5 is a fragmentary section substantially on the line 5—5 of Fig. 4.

The weighing mechanism is of conventional type and need not be further described than to state that it comprises customary connections and mechanical parts, generally indicated by the numeral 27 (Fig. 3), which are actuated by the vertically movable rod 28 connected to the scale platform, and which, through suitable connections, rotate a shaft 28 (Figs. 4 and 5) on which is mounted the weight-indicating disc 29 having numerals on its periphery indicating the actual weight and so arranged that any one of these numerals may become visible through a window in the forward portion 30 (Fig. 1) of the top member 26 in accordance with the position to which the disc 29 is rotated by the weight of a person standing on the scale platform 22.

The member 26 is provided with two coin slots 31 and 32 respectively at its right- and left-hand sides, these coin slots registering with the upper ends of guideways 31ᵃ and 32ᵃ (Fig. 4) which lead to a chute 33 within the casing arranged to deliver coins deposited therein into a coin receptacle 34.

Within the casing are guideways for guiding a vertically slidable column 35 (Figs. 2, 3, 5 and 6) constituting a portion of a carriage which also comprises the transversely extending arm 36 (Figs. 1 and 2) from which horizontal arms 37 and 38 project rearwardly (as referred to a person standing on the platform 22, and facing the mirror 25) the arms 37 and 38 being parallel and spaced apart horizontally a distance preferably somewhat greater than the right-to-left width of the scale platform 22. Normally, the carriage comprising the column 35 and arms 37 and 38 is so located that these arms are above the level of the top of the head of the tallest person who may be expected to stand on the platform 22. One of the arms, for example the arm 37, is provided at its forward end with a housing 39 (Fig. 1) in which is arranged an electrically energized light source, for example an incandescent bulb, while the other arm 38 (Fig. 1) is provided at its forward end with a housing 40 in which is a light sensitive photoelectric cell, the parts being so arranged that under normal conditions light emitted by the light source in the housing 39 is directed as a horizontal beam to activate the photoelectric cell in the housing 40. Hereinafter, the light source, photoelectric cell, and accessory parts, are referred to for convenience as the photocell unit. Transverse members E and E' carry antifriction rolls for guiding the column 35 as it moves up and down.

A horizontal shaft 41 (Figs. 3, 5 and 6) is arranged to turn in bearings in the upper part of the casing and on this shaft are mounted the armatures of two electric motors M1 and M2 (Fig. 3) respectively, the motors being so devised that when one motor is energized it turns the shaft 41 in one direction and when the other motor is energized it turns the shaft in the opposite direction. Fixed to this shaft 41 is a drum or pulley 42 (Figs. 3 and 6). One end of a cable 43 is fixed to a periphery of this drum or pulley, and extending downwardly, is connected to an ear 44 (Fig. 3) projecting laterally from the lower part of the vertically movable column 35 of the carriage. From the ear 44 the cable extends downwardly to the lower part of the casing where it passes about an idler pulley (not shown) and thence up in to the upper part of the casing where it passes about a second idler pulley P (Fig. 3) and thence down to the drum or pulley 42 to which this end of the cable is also attached. In the opposite side of the casing there is a second cable 43$^x$ (Fig. 3) one end of which is attached to the lower end of the column, the cable extending up and about an idler pulley P' in the upper part of the casing and then down to a counterweight 45, designed substantially to counterbalance the weight of the vertically movable carriage, and which is preferably housed within a vertically disposed guiding casing 46 which prevents the weight from swinging and thus interfering with other parts of the mechanism.

A horizontal shaft 47 (Figs. 5 and 6) is mounted in bearings in the upper forward portion of the casing and just below the top member 26 and on this shaft 47 there is fixed a gear 48 (Fig. 6) which meshes with a gear 49 fixed to a horizontal shaft 50 (Fig. 6) mounted in bearings in the casing and which meshes with a gear 51 fixed to the shaft 41. The gears 49 and 51 are of the same pitch diameter while the gear 48 is of twice the pitch diameter of the gear 49. The gear train, comprising the several gears, is so designed that, while the carriage is moving from its extreme upper to its extreme lower position, the gear 48 makes a single complete rotation.

Two cylinders 52 and 53 (Figs. 7 and 8) are fixed to the shaft 47 so as to rotate therewith, these cylinders being arranged below the right and left-hand portions, respectively, of the top member 26 of the casing, with their proximate ends spaced apart. Associated with each of these cylinders 52 and 53 there is a shutter device S and S1 (Figs. 6 and 7) respectively, each comprising radial arms 54 and 55 which are pivoted on the shaft 47 at opposite ends of the corresponding cylinder so that the shutter device may be swung circumferentially with reference to the corresponding cylinder. One arm of each shutter device has a forwardly directed leg 56 (Fig. 6) provided at its forward end with a horizontal extension 56$^a$ (Fig. 7) on which is mounted a swinging detent 57 which is urged by a spring 58 in a direction such that its lower end normally rests upon a fixed support 59. A solenoid 60 is fixed to the forward portion of the arm 56, and when this solenoid is energized it attracts the lower part of detent 57, thus disengaging it from the abutment 59, whereupon the arm 56 and the parts carried thereby move downwardly by gravity, thus swinging the shutter in a forward direction circumferentially of the corresponding cylinder 52 or 53.

Pins 61 (Figs. 6 and 7) project from the outer ends of the respective cylinder 52 and 53, being so arranged that when the cylinders 52 and 53 are turned in the reverse direction (after the weighing and height measuring cycle has been completed) these pins engage the detents 57 and swing the arms 56 upwardly until the detents are re-engaged with the fixed abutments 59 and thus hold the shutters in normal position.

Two drums 62 and 63 (Figs. 8 and 10) are mounted on the shaft 50 below the upper portion of the top member 26 of the casing, the cylinder 63 being fixed to the shaft while the cylinder 62 is loose on the shaft and driven by the cylinder 63 through intermediate gearing 64 of a type (familiar in computing apparatus and which need not be described herein in detail) such that a complete rotation of the drum 63 moves the drum 62 through a fractional rotation. The periphery of the drum 63 is provided with characters with numbers from 0 to 11 indicating inches of height, while the periphery of the drum 62 is provided with numbers indicating feet of height. The gearing 64 is so devised that when the cylinder 63 has made one complete turn, the drum 62 will have been turned a distance representing one foot. Since the heighths of people do not vary by many feet, it is usually sufficient if the drum 62 be marked with the numerals 4, 5, 6 and 7 respectively while the drum 63 will carry numerals from 0 to 11.

Each of the cylinders 52 and 53 is provided with a plurality of circumferentially extending areas 65 (Figs. 9 and 9$^a$) having characters inscribed thereon representing the proper weight for a given height, each row of characters extends circumferentially of the cylinder, the several rows corresponding to successive age periods. For example, one row may correspond to ages from 20 to 24 years, the next row to ages from 25 to 30 years, etc. Since the proper weight-height ratio is different for males and females, one of the cylinders, for example, the cylinder 52 is provided with characters representing the proper weight-height ratio for males, and the cylinder 53 with corresponding characters representing the proper weight-height ratio for females.

The top member 26 of the casing is provided at its lower portion with two spaced horizontally elongate slots 67 and 68 (Figs. 8 and 9) respectively, and with a third horizontally elongate slot 69 (Figs. 8 and 10) located rearwardly of the slots 67 and 68 and centrally of the top number 26. The slots 67 and 68 are registered with the shutter S and S' respectively, while the slot 69 is arranged to expose portions of the drums 62 and 63. Beneath the top member 26 at the region of these slots there is arranged a horizontally movable slide plate 70 (Figs. 8 and 9) having rack teeth 71 along its upper edge which are engaged by pinions 72 and 72$^a$ which are fixed to shafts provided with knobs K and K$^1$ (Figs. 1, 6 and 8) respectively, located at the top member 26. By turning either of these knobs K or K$^1$ the plate 70 may be moved laterally. This plate 70 is provided with two windows 73 and 73$^a$ (Fig. 8) respectively, so located so that as the plate 70 is moved these windows travel along below the slots 67 and 68 respectively.

Desirably, a panel mounting plate 26ᵃ is arranged directly below the top wall 26 and carries transparent panels N (Fig. 9) to protect the parts exposed through the slots 67 and 68.

The plate 70 also carried a series of characters representing the successive age periods above referred to, so arranged that as the plate 70 is moved laterally, one or another of these characters is brought into view through a window W (Fig. 8).

The shutters S and S¹ are normally disposed in a position such as to close both slots 67 and 68 respectively, so that regardless of the position of the plate 70, none of the characters on the cylinders 52 and 53 will be visible until one of the shutters, S or S1 has been moved to the inoperative position.

As illustrated in Fig. 6, there are two electrical switches 110 and 127ᵃ, respectively, (hereinafter more fully described) arranged within the casing and each provided with a resilient actuating arm 75 and 76 respectively. A pin 77 projects from one face of the gear 48 and is operative, by contact with one of the arms 75 or 76, to actuate the corresponding switch as the gear 48 is completing its cycle of operation in one direction or the other, that is to say when the vertically movable carriage nears the end of its movement, upwardly, or downwardly, respectively.

Referring to the electrical diagram Fig. 11, the conduits C and C' supply electrical current from a source to a fuse box 100, on which a lamp L is desirably mounted to show when current is being supplied. From this fuse box conductors 101 and 102 supply current to the various electrically actuated elements of the apparatus.

Conductor 101 leads to a relay 103 comprising a normally open siwtch 104 which is closed by the energizing of a coil 105, and which is mechanically locked in a closed position after being closed by a detent D. This relay also comprises a coil 106 which, when energized, releases the detent D and allows the switch to open. When the switch 104 is closed, current flows through conductor 107 from conductor 101 to one terminal of the motor M¹ which is the motor which moves the carriage downwardly. A conductor 108 connects the other terminal of motor M¹ to the conductor 102.

A conductor 109 leads from conductor 101 to one terminal of the motor M² which moves the carriage up. The other terminal of the motor M² is connected to one pole of the switch 110. From the other pole of switch 110 a conductor 111 leads to one pole of a double pole switch 112 whose movable arm 113 is always connected to conductor 108 and which, when swung to the left, as shown in Fig. 11 closes the circuit motor M² (provided switch 110 is also closed). When arm 113 is moved to the right (Fig. 11) current flows from conductor 108 to a conductor 114 which leads to a photoelectric unit 115. This photoelectric unit comprises the lamp or equivalent light source carried by the arm 37 and the photoelectric cell (of conventional type which responds sensitively to the impact of light thereon) carried by arm 38. It will be recalled that the light source is arranged to deliver a horizontal beam of light across the space between the arms for activating the photoelectric cell. A conductor 116 leads from the cell unit 115 to the conductor 101. When the circuit to the photoelectric unit is closed by the movement of the switch arm 113 to the right, the light source and cell are both supplied with current.

In order to avoid overloading the highly sensitive photoelectric cell, the photoelectric unit comprises a relay (not illustrated) of conventional type which, so long as the cell is actviated, holds a switch in the conductor 117 open, the switch closing instantly when the cell is deactivated, thereby to supply energizing current to the coil 118 of another relay 118ᵃ. This relay 118ᵃ comprises a switch 119 which is closed when coil 118 is energized. One pole of this switch 119 is connected to conductor 108 by conductor 108ᵃ while its other pole is connected by conductors 120 and 120ᵃ to one terminal of the release coil 106 of relay 103. So long as the switch 119 is open, the coil 106 receives no current, but if the beam of light which activates the photoelectric cell is broken and the cell is no longer activated, current is supplied to conductor 117, the switch 119 closes, and current is supplied to the coil 106 of relay 103, thus releasing the detent D so that the switch 104 opens and cuts off current from the motor M' so that the downward motion of the carriage ceases at once.

One terminal of the switch closing coil 105 of relay 103 is connected to the conductor 101 while the other terminal of said coil is connected by the conductor 121 to one pole of the normally open coin-actuated switch 122 whose other pole is connected by conductor 123 to conductor 108. When a coin is inserted in the switch device 122, the circuit is closed momentarily and current is supplied to the coil 105 of relay 103 thereby closing and locking switch 104 so that the motor M' starts.

The coin actuated switch device 122 also comprises a normally open switch 122ᵐ having one pole connected to conductor 123 and the other pole connected to one terminal of a solenoid 60 (Fig. 7) forming part of a release device 125, for the shutter S, the other terminal of said coil being connected by conductor 126 to conductor 101. There are two coin actuated switch devices 122 and 122ᵃ which are alike in all respects except that the switch device 122ᵃ supplies current to the solenoid of the release device 125ᵃ of the shutter S1.

When a coin is dropped into either of the switch devices 122 or 122ᵃ, (while a person is standing on platform 22) the coil 105 is energized, as above described, to close and lock switch 104, and the corresponding shutter release device 125 or 125ᵃ is actuated to release the corresponding shutter S or S1.

From the conductor 120, which is supplied with current by the closing of relay actuated switch 119, a conductor 127 leads to the movable arm of a switch 127ᵃ. The arm of switch 110 is normally in position to connect the conductor 111 with one pole of the motor M2 (except when carriage is at the upper or lower limit respectively of its path of movement) but no current is supplied to the motor M2 so long as switch arm 113 is swung to the right or when switch 110 is open. The switch arm 113 normally occupies the left-hand position but it is mechanically moved to the right by the weight of the person standing on the scale platform and when moved to the right the photoelectric unit is thereby energized. If the person now drops a coin in either of the switch devices 122 or 122ᵃ the circuit of motor M1 is closed and the carriage starts downwardly. As soon as the carriage starts down, the switch 110 is closed by the movement of pin 77 (Fig. 6) away from the actuating arm 75. If the person should now jump off of the platform before the light beam has been interrupted, the switch arm 113 will move to the left, thereby breaking the circuit of the photoelectric unit and thus causing current flow through coil 106, so as to break the circuit of the motor M1. At the same time, current will flow from conductor 120 through conductor 127 and the closed switch 110 so at once to start the motor M2 to restore the carriage to its elevated position.

In accordance with the intended operation of the apparatus, the person who wishes to ascertain his height and weight will step onto the platform 22, which is thereby depressed, and by means of the usual scale mechanism the shaft 28 is turned so as to rotate the numbered disk 29 until the actual weight of the person is exhibited through the window at 30.

As above noted, the downward movement of the scale platform actuates the switch 112 mechanically by suitable connections so as to swing the arm 113 to the right, Fig. 11, thus closing the circuit of the photoelectric unit, energizing the light source to project a beam of light horizontally across the space between the arms 37 and 38 to impinge upon the photoelectric cell and activate the latter. Immediately the cell is activated, the relay within the photoelectric unit breaks the circuit comprising the conductor 117, so that the switch at 118ª remains open. A person standing on the scale platform now, according to his or her sex, turns one of the knobs K or K' respectively, thereby moving the slide to the right or left until his particular age period appears in the window W (Fig. 8). The operator now inserts the proper coin in one or the other of the slots 31 or 32, the insertion of the coin momentarily closing the switch 122 or 122ª, respectively, and thereby momentarily closing the circuit of the switch 104 to start the motor M1 (which moves the carriage down). The switch 104 is locked by the detent D so that the motor continues to operate even though the coin has passed through the coin-operated switch and has dropped into the coin receptacle 34. The dropping of the coin through the device 122 or 122ª also closes the circuit through the shutter release solenoid 125 or 125ª corresponding to the respective switch and thus one or the other of the shutters S or S1 respectively swings downwardly and forwardly so as to uncover the corresponding slot 67 or 68 in the top member 26 of the case. The movement of the slide 70 to the right or left in the operation of selecting the proper age period has registered one of the windows 73 or 73ª with the proper series of characters on the cylinders 52 or 53 where shutter has been opened respectively and thus this particular row of characters on the cylinder is visible through the window in the slide. The motor continues to move the carriage downwardly until the light beam from the light source is interrupted by the top of the person's head. The interruption of the light beam immediately deactivates the photoelectric cell whereupon the relay within the cell unit closes the circuit through the conductor 117, energizing the coil 118 and closing the switch 119. Current immediately flows through the conductor 120 to the coil 106, energizing the latter so that it pulls the detent D to a position such as to release the switch 104 which immediately opens and breaks the circuit of motor M1 so that the downward motion of the carriage instantly ceases. Since the cylinders 52 and 53 which carry the series of characters indicating proper weight turns only while the carriage is moving, the cylinder stops with the proper weight according to height visible through the window 73 or 73ª respectively, remaining in this position until the person steps from the scale platform, whereon the switch arm 113 is swung to the left as shown in Fig. 11. The circuit of motor M2 is thus closed, and motor M2 raises the carriage until pin 77 actuates the arm 75 of normally closed switch 110 thereby breaking the circuit of motor M2 and stopping the carriage in its uppermost position.

If a person standing on the scale platform should grasp one or both of the arms 37 or 38 and attempt to pull them down, (assuming that he has not inserted the coin) no current is passing through the motor M1 so that the motor shaft 41 is free to turn and the arms 37 and 38 move downwardly without damage, but as soon as the person steps off from the platform the switch arm 113 moves to the left and current flows through switch 110 (which has been closed by the downward movement of the carriage) so as immediately to start motor M2 to restore the carriage to its uppermost position. If, without standing on the platform, a person grasps one or both of the arms 37 or 38 and tries to pull them down, even a slight initial downward motion will close switch 110 and motor M2 will immediately pull the arms up again.

If a person who is too short to interrupt the light beam while standing on the platform, should insert a coin, thus starting the carriage downwardly, the pin 77 (when the carriage has reached the lower limit of its path of motion) will actuate the control arm 76 of the switch 127ª, whose terminals are connected (as above described) to the conductor 120 and 108 respectively, and thus current is supplied to the coil 106, so breaking the circuit of motor M1 just as though the light beam had been broken.

While one desirable embodiment of the invention has herein been shown and described by way of example, it is to be understood that the invention is broadly inclusive of all modifications and equivalents within the scope of the appended claims.

I claim:

1. In combination in apparatus for measuring height and weight, a scale platform, height measuring means including a vertically movable carriage, means normally retaining said carriage in an elevated position, and means for effecting movement of the carriage in elevation, said means comprising an electric motor for moving the carriage down and a second motor for moving the carriage up, means which responds to the insertion of a coin, only after a downward motion of the scale platform, for closing the circuit of the motor which moves the carriage down, detector means movable with the carriage, said detector means being operable when it reaches the level of the head of a person standing on the scale platform to break the circuit of the motor which moves the carriage down, and means responsive to the removal of weight from the scale platform for closing the circuit of the motor which moves the carriage up.

2. In combination in apparatus of the class described, a rotary disc provided with characters indicating weight, a scale platform, means responsive to downward motion of the platform for turning the disc, height measuring means, including a rotary member provided with characters indicating the height of a person standing on the platform, means responsive to downward movement of the platform for initiating operation of the height measuring means, and a movable member actuated by the height measuring means provided with characters indicating the proper weight for the measured height.

3. In combination in apparatus for measuring height and weight, a scale platform, a vertically movable carriage, and means normally holding the carriage in an elevated position, said carriage supporting a photo-electric cell and means for directing a beam of light onto the cell, means operative in response to the weight of a person standing on the scale platform to move the carriage downwardly until the light beam is interrupted by the head of the person standing on the platform, and means whereby the downward motion of the carriage is arrested upon interruption of the light beam.

4. In combination in apparatus for measuring height and weight, a scale platform, a carriage comprising a vertcially movable column located forwardly of the platform, an electric motor for moving the column downwardly from a normal elevated position, the carriage having two rearwardly projecting arms spaced horizontally and located and to the right and left respectively of the platform, a photo-electric cell carried by one arm and an electrically energized light source carried by the other arm and designed to direct a horizontal beam of light transversely across the platform onto the photoelectric cell, means operative by the depression of the scale platform by the weight of a person standing thereon to complete an energizing circuit through the light source, and means responsive to the dropping of a coin after the light source has been energized to close the circuit of the motor which moves the carriage column downwardly.

5. In combination in apparatus according to claim 4, means for approximately counterbalancing the carriage, and means operative in response to the interruption of the beam of light from the light source to break the circuit of the motor which moves the carriage downwardly.

6. In combination in apparatus according to claim 4, a motor for restoring the carriage to its normal position after it has been lowered, and means responsive to the removal of weight from the scale platform for closing the circuit of said latter motor.

7. In combination with a weighing scale having a vertically movable platform, a vertically movable carriage carrying horizontally spaced arms arranged at opposite sides of the platform and which are normally at a height about the level of the top of the head of a person standing on the platform, a photo-electric cell carried by one of said arms, a light source carried by the other of said arms arranged to direct a horizontal beam of light toward the cell, means for moving the carriage down, and means responsive to the breaking of the light beam, by the interposition of a person's head between the cell and light source, to stop the downward motion of the carriage.

8. Apparatus according to claim 7 comprising means operative to stop the downward motion of the carriage at a predetermined level above the platform, even though the light beam is not interrupted.

9. Apparatus according to claim 7 comprising means to reverse the motion of the carriage if the person standing upon the platform steps off before the downward motion of the carriage has been stopped by interruption of the light beam.

10. Apparatus according to claim 7 wherein the means for moving the carriage comprises two motors, one of the motors being operative to move the carriage downwardly, and the other to move the carriage upwardly, and means operative to start the latter motor into operation, if, when no one is standing on the scale platform, subsantial weight be applied to one or both of the arms.

11. Apparatus according to claim 10 comprising means operative to start the motor which moves the arms up when the person steps off of the scale platform.

12. Apparatus according to claim 7 comprising a switch which is operative to supply current to the light source and photo-electric cell in response to downward motion of the scale platform resultant from the weight of a person standing thereon.

13. Apparatus according to claim 12 comprising means to release the detent when weight is removed from the scale platform.

14. Apparatus according to claim 7 wherein the means for moving the carriage downwardly comprises an electric motor, a holding relay for completing the motor circuit, a detent for holding the circuit closed during the downward motion of the carriage, and means responsive to the downward motion of the scale platform for energizing said relay.

15. In combination in apparatus of the class described having a scale platform which moves downwardly in response to the weight of a person standing thereon, a carriage which automatically moves down from a normal elevated position to a position corresponding to the height of a person standing on the scale platform, a rotary drum having thereon a plurality of circumferentially extending series of numerals, each series indicating the proper weight according to a given height, the several series corresponding to different ages respectively, a manually movable shutter operative to conceal all of the numerals on said drum except one at any given time, and means responsive to the combined movement of the scale platform and the height measuring means for turning the drum.

16. In combination in apparatus of the class described having height measuring means comprising a vertically movable carriage supporting a photo-electric cell and a light source which normally directs a beam of light toward the cell, the cell and light source being so arranged that an object interposed between the light source and cell interrupts the light beam and thereby deenergizes the cell, an electric motor for moving the carriage downwardly from a normal, elevated position, a relay in the motor circuit operative, when energized, to close the motor circuit, means for holding the circuit closed, a release coil which, when energized, opens the motor circuit, a coin actuated switch for energizing the relay, a control relay for supplying current to the release coil, the control relay responding to the photo-electric cell to keep the release coil deenergized, so long as the photo-electric cell is activated, the interruption of the beam from the light source by the interposition of an article between the light source and photo-electric cell deactivating the cell and thereby actuating the control relay to deliver current to the release coil so as to open the motor circuit.

17. In combination in apparatus for indicating a person's height and weight, a scale platform, height measuring means, a rotary cylinder provided with a plurality of rows of characters, each indicating the proper weight for a certain age and height, each row of characters extending circumferentially of the cylinder, the successive rows, axially of the cylinder, corresponding respectively to different age periods, a slide movable axially of the cylinder, the slide having a window which may be registered with any selected row of characters on the cylinder, means for indicating that row of characters with which the window should be registered according to the age of a person standing on the scale platform and whose height and weight are to be measured, means whereby the slide may be moved manually, a closure normally preventing any character of the cylinder from being seen through the window in the slide, and means responsive to the deposit of a coin for actuating the height measuring means and concomitantly opening the closure and turning the cylinder to exhibit, through the window in the shutter, the proper weight at the selected age, for the necessary height.

18. Apparatus according to claim 17 wherein there are two coaxial cylinders, the characters on the respective cylinders designating proper weight, at given age and height, of males and females respectively, the slide having two windows corresponding respectively with the two cylinders, a shutter associated with each cylinder respectively, two coin receiving devices so designed that deposit of a coin in either of said devices initiates operation of the height measuring means, the opening of one of the respective shutters, and the partial rotation of the cylinders.

19. Apparatus according to claim 17 wherein the means for selecting the row of characters on the cylinder to be exhibited through the window in the slide comprises a series of groups of characters extending lengthwise of the slide, each group indicating an age period, respectively, and stationary means provided with a window through which any selected one of said group of characters may be seen as the slide is moved.

20. In combination, an apparatus for measuring height and weight, a scale platform, height measuring means including a detector and carrier means mounting the detector for vertical movement relative to the platform, said detector normally having an at rest position above the level of the top of the head of the tallest person who may be expected to stand on the platform, motivating means for moving the carrier in elevation, means responsive to the weight of a person standing on the platform to effect operation of the motivating means to move the carrier downwardly, means carried by the detector to stop downward movement of the carrier when the detector reaches the level of the top of the head of the person standing on the platform, said last-mentioned means being operative in response to removal of the person from the platform after the detector has been brought down to the level of the top of the head, to effect operation of the motivating means to move the carrier upwardly, and means for terminating operation of said motivating means when the detector means reaches its initial at rest position.

21. In an apparatus of the class described, a platform on which a person may stand, a vertically movable carriage, detector means mounted on the carriage, means normally holding the carriage in an elevated position such that the detector means is above the level of the head of a person standing on the platform, and means for moving the carriage in elevation, comprising two electric motors, one for moving the carriage up and the other for moving it down, means responsive to the detector when the latter reaches the level of the top of the head for breaking the circuit of that motor which moves the carriage down, and automatic means for closing the circuit of the other motor after the circuit of the first motor has been broken.

22. In an apparatus of the class described, a platform on which a person may stand, a vertically movable carriage, detector means mounted on the carriage, means normally holding the carriage in an elevated position such that the detector means is above the level of a head of a person standing on the platform, and means for moving the carriage in elevation, comprising a shaft, two electric motors for turning said shaft, one for turning the shaft in one direction and the other for turning the shaft in the opposite direction, a drum on the shaft, a cable actuated by the drum, said drum when rotated in one direction moving the carriage up and when rotated in the other direction moving the carriage down, said detector means being sensitively responsive to the presence of a person's head when, during downward movement of the carriage the detector reaches a level of the top of the person's head, and means moving in accordance with the cable for breaking the circuit for the respective motors when during downward movement of the carriage the detector reaches the level of the top of the person's head and when during upward movement of the carriage the detector reaches its elevated position.

23. In an apparatus of the class described, a platform on which the person may stand, a vertically movable carriage, detector means mounted on the carriage, means normally holding the carriage in an elevated position such that the detector means is above the level of a head of the person standing on the platform, means for moving the carriage in elevation, comprising an electric motor, a shaft driven by the motor, a drum on the shaft and means actuated by the drum for effecting movement of the carriage, said detector means being sensitively responsive to the presence of a person's head when, during downward movement of the carriage the detector reaches the level of the top of the person's head, control means for stopping downward motion of the carriage when the detector so responds, and a rotary height indicator geared to the shaft for transmission of the motion of the shaft to said height indicator.

24. In an apparatus of the class described, a platform on which a person may stand, a vertically movable carriage, detector means mounted on the carriage, means normally holding the carriage in an elevated position such that the detector means is above the level of the head of a person standing on the platform, means for moving the carriage in elevation comprising an electric motor, a shaft driven by the motor, a drum on the shaft, and a cable actuated by the drum for moving the carriage, said detector means being sensitively responsive to the presence of a person's head when, during downward movement of the carriage the detector reaches the level of the top of the person's head, control means for stopping downward motion of the carriage when the detector so responds, a rotary cylinder provided with peripherally arranged characters indicating the proper weight for a given height, and gearing for transmitting motion from the shaft to the cylinder.

25. In an apparatus of the class described, means for measuring a person's height comprising a platform on which the person seeking to measure his height may stand, a detector comprising a photoelectric cell and light source spaced from the cell and so arranged as normally to direct a horizontal beam of light into the cell, means mounting the detector for movement in elevation with respect to the platform, said detector having an at rest position above the level of the head of the tallest person expected to stand on the platform, a height indicator which moves in accordance with the downward motion of the detector, motivating means for moving the detector in elevation, means responsive to a person standing on the platform to initiate operation of said motivating means to move the detector down to the top of the head, means responsive to the interception of the beam of light by the top of the head of the person to stop the downward movement, and means operable by removal of the person from the platform so as to permit the beam of light to re-enter the detector to effect operation of said motivating means to move the detector upwardly to its initial at rest position.

References Cited in the file of this patent

UNITED STATES PATENTS

| | | |
|---|---|---|
| 753,548 | Cook | Mar. 1, 1904 |
| 1,011,576 | Castleman | Dec. 12, 1911 |
| 1,596,867 | Brunaugh | Aug. 24, 1926 |
| 2,018,416 | Quinte | Oct. 22, 1935 |
| 2,091,303 | Brelsford | Aug. 31, 1937 |
| 2,146,727 | Fleischer | Feb. 14, 1939 |
| 2,294,831 | Carson | Sept. 1, 1942 |
| 2,554,171 | Brunot | May 22, 1951 |
| 2,701,854 | Carrick | Feb. 8, 1955 |
| 2,708,368 | Kolish | May 17, 1955 |

FOREIGN PATENTS

| | | |
|---|---|---|
| 369,369 | Great Britain | Mar. 24, 1932 |
| 586,142 | Great Britain | Mar. 7, 1947 |